UNITED STATES PATENT OFFICE.

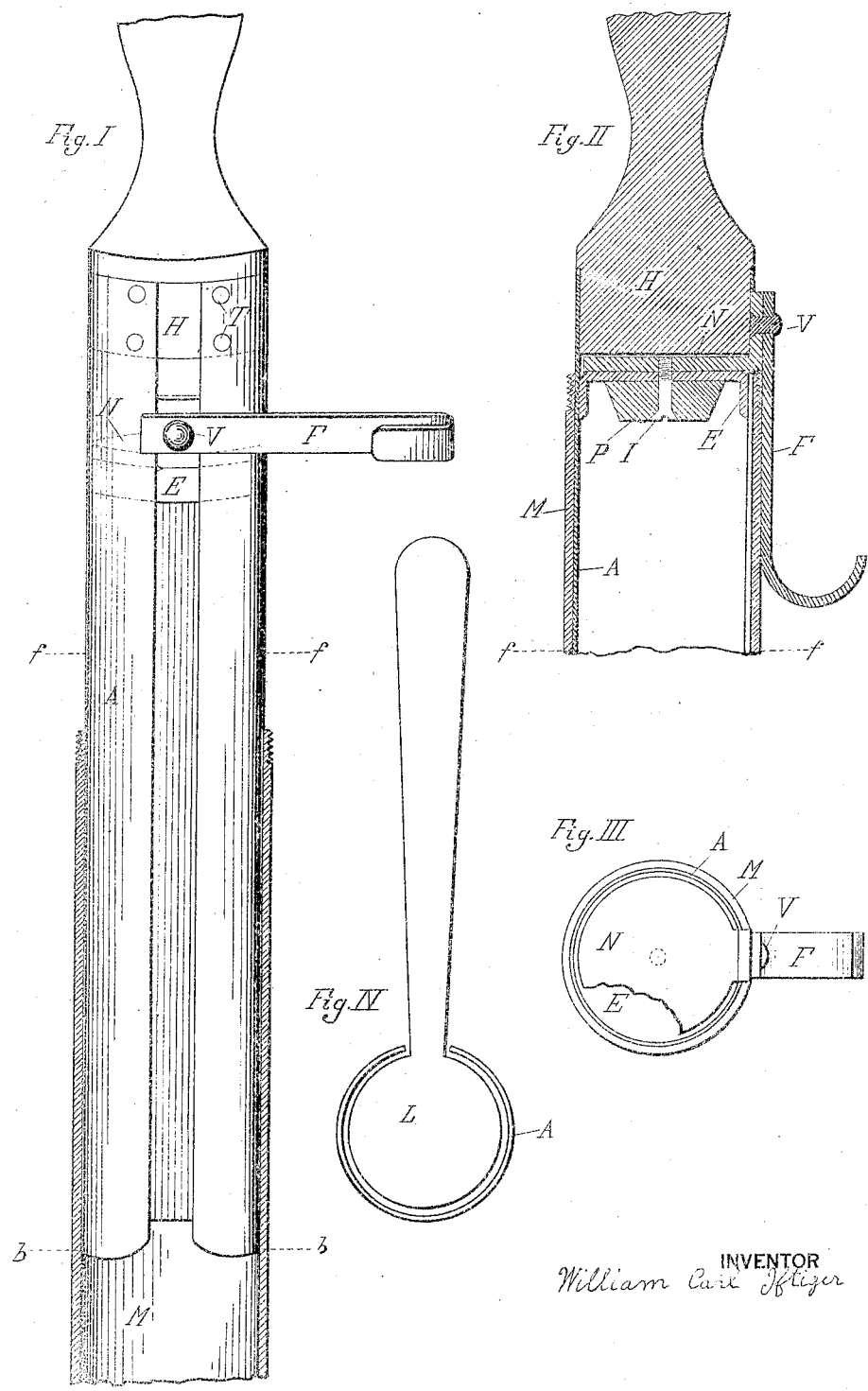

WILLIAM CARL IFTIGER, OF WATTS, CALIFORNIA.

FILLER FOR COMPRESSION GREASE-GUNS.

1,330,539.  Specification of Letters Patent.  Patented Feb. 10, 1920.

Application filed August 11, 1919. Serial No. 316,753.

*To all whom it may concern:*

Be it known that I, WILLIAM CARL IFTIGER, a citizen of the United States, residing at Watts, in the county of Los Angeles and State of California, have invented new and useful Improvements in Fillers for Compression Grease-Guns, of which the following is a specification.

My invention relates to improvements in devices for filling grease guns and the like and the objects of my invention are to provide a filling means for a grease gun which will put a charge of hard grease into the gun casing in almost solid form eliminating practically all air pockets, a second object being to provide means for filling a grease gun that is quick and cleanly in its operation.

Figure 1 is a perspective view of the filler partially entered into a grease gun casing, the casing being shown in section.

Fig. 2 is a fragmentary sectional view of the filler fully entered into a grease gun casing.

Fig. 3 is a top view of the filler with a handle removed and a grease gun casing.

Fig. 4 is an outer end view of the filler showing a method of filling the filler with hard grease using a proper paddle.

In carrying out my invention a cylindrical casing A is provided having one of its ends open and a closure fixed in the other end and extending therefrom forming an adequate handle H. The casing A also has a slot in its wall running from end to end and disposed longitudinally. Within the casing is fixed a piston comprising a cup leather E positioned against a plate N being held by a washer P and a screw I.

The plate N has an integral lug extending outwardly through the slot in the casing A. Pivotally connected to the lug by the rivet V is a hook F, the hook being disposed away from the casing A so that the casing of a grease gun may be slipped between the hook F and casing A.

In the operation of the device the piston E is first carried backwardly to the inner end of the casing A by manipulating the hook F. Grease is then filled into the casing. This may be accomplished in several different ways but preferably a paddle L such as is shown in Fig. 4 may be used to place successive plugs of grease into the gun against the piston E the paddle being operated with the handle extending from the longitudinal slot in the casing.

When the casing is filled with grease it is then inserted into a grease gun casing. The grease gun casing is then grasped with one hand with the fore-finger engaging the hook F. The handle H is then taken in hand and the casing A withdrawn from the grease gun casing leaving a cylindrical deposit of hard grease within the gun. The piston E is then returned to the bottom of the filler and it is again ready for use.

Various changes might be made in the structure of the device and the form of the piston, as set forth herein in its preferred form, without departing from the spirit thereof as claimed.

I claim:

1. A filling device for grease guns comprising a cylindrical casing having a longitudinal slot, a piston slidably mounted in the casing, a handle connected with the piston through the slot whereby the piston may be held while the casing is withdrawn from a grease gun casing.

2. A filling device for grease guns comprising a cylindrical casing having a longitudinal slot, a piston slidably mounted in the casing having a lug extending through the slot, a hook pivotally connected to the lug whereby the piston may be held while the casing is withdrawn from a grease gun casing.

3. A filling device for grease guns comprising a cylindrical casing having a longitudinal slot, a closure for one end of the casing and extending therefrom forming a proper handle, a piston slidably mounted in the casing having a lug extending through the slot, a hook pivotally connected to the lug whereby the piston may be held while the casing is withdrawn from a grease gun casing.

WILLIAM CARL IFTIGER.